US007316273B2

(12) United States Patent
Nguyen

(10) Patent No.: US 7,316,273 B2
(45) Date of Patent: Jan. 8, 2008

(54) METHODS AND COMPOSITIONS FOR ENHANCING HYDROCARBON PRODUCTION

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/118,291

(22) Filed: Apr. 29, 2005

(65) Prior Publication Data
US 2006/0243442 A1 Nov. 2, 2006

(51) Int. Cl.
E21B 33/138 (2006.01)
(52) U.S. Cl. .................. 166/279; 166/292; 166/300
(58) Field of Classification Search ............ None
See application file for complete search history.

(56) References Cited

U.S. PATENT DOCUMENTS

| 3,285,341 | A | * | 11/1966 | Parker ................. 166/305.1 |
| 3,719,228 | A | * | 3/1973 | Garcia ................... 166/281 |
| 3,902,557 | A | * | 9/1975 | Shaughnessy et al. ...... 166/295 |
| 4,670,501 | A | | 6/1987 | Dymond et al. |
| 4,681,165 | A | | 7/1987 | Bannister |
| 4,772,646 | A | | 9/1988 | Harms et al. |
| 4,777,200 | A | | 10/1988 | Dymond et al. |
| 5,095,987 | A | | 3/1992 | Weaver et al. |
| 5,249,627 | A | | 10/1993 | Harms et al. |
| 5,278,203 | A | | 1/1994 | Harms |
| 5,381,864 | A | | 1/1995 | Nguyen et al. |
| 5,492,178 | A | | 2/1996 | Nguyen et al. |
| 5,501,274 | A | | 3/1996 | Nguyen et al. |
| 5,582,249 | A | | 12/1996 | Caveny et al. |
| 5,697,440 | A | | 12/1997 | Weaver et al. |
| 5,775,425 | A | * | 7/1998 | Weaver et al. ............... 166/276 |
| 5,787,986 | A | | 8/1998 | Weaver et al. |
| 5,833,000 | A | | 11/1998 | Weaver et al. |
| 5,839,510 | A | | 11/1998 | Weaver et al. |
| 5,853,048 | A | | 12/1998 | Weaver et al. |
| 5,871,049 | A | * | 2/1999 | Weaver et al. ............... 166/276 |
| 5,921,317 | A | | 7/1999 | Dewprashad et al. |
| 5,924,488 | A | | 7/1999 | Nguyen et al. |
| 5,960,878 | A | | 10/1999 | Nguyen et al. |
| 6,016,870 | A | | 1/2000 | Dewprashad et al. |
| 6,047,772 | A | | 4/2000 | Weaver et al. |
| 6,059,034 | A | | 5/2000 | Rickards et al. |
| 6,209,643 | B1 | | 4/2001 | Nguyen et al. |
| 6,311,773 | B1 | | 11/2001 | Todd et al. |
| 6,330,916 | B1 | | 12/2001 | Rickards et al. |
| 6,439,309 | B1 | | 8/2002 | Matherly et al. |
| 6,450,260 | B1 | | 9/2002 | James et al. |
| 6,534,449 | B1 | | 3/2003 | Gilmour et al. |
| 6,660,693 | B2 | | 12/2003 | Miller et al. |
| 6,729,408 | B2 | | 5/2004 | Hinkel et al. |

| 2003/0230408 | A1 | | 12/2003 | Acock et al. |
| 2004/0014608 | A1 | | 1/2004 | Nguyen et al. |
| 2005/0049151 | A1 | * | 3/2005 | Nguyen et al. ............ 507/203 |

FOREIGN PATENT DOCUMENTS

| EP | 0879935 A2 | 11/1998 |
| EP | 1132569 A2 | 12/2001 |

OTHER PUBLICATIONS

Al-Anazi, Hamoud A., et al, SPE 77546 "Laboratory Measurements of Condensate Blocking and Treatment for Both Low and High Permeability Rocks", Society of Petroleum Engineers Inc., SPE Annual Technical Conference and Exhibition, San Antonio, TX Sep. 29-Oct. 2, 2002.
Al-Anazi, Hamoud A., et al, SPE 80901 "A Successful Methanol Treatment in a Gas/Condensate Reservoir: Field Application", Society of Petroleum Engineers, 2003 SPE Production and Operations Symposium, Oklahoma City, Mar. 23-25, 2005.
R.K. Eresman., et al, SPE 20767 "Suffield Upper Mannville 1 Gas Storage Project", Society of Petroleum Engineers, Inc., 65th Annual Technical Conference and Exhibition of the Society of Petroleum Engineers Held in New Orleans, LA, Sep. 23-26, 1990.
Liangui Du, et al, SPE 62935 "Use of Solvents to Improve the Productivity of Gas Condensate Well", Society of Petroleum Engineers, Inc., 2000 SPE Annual Technical Conference and Exhibition Held in Dallas, TX, Oct. 1-4, 2000.
Industrial Solvents Handbook (5th Edition) XP-002385147, none.
Foreign Search Report and Written Opinion for PCT/GB2006/001451, Apr. 20, 2006.
Attia, Yosry et al, *Adsorption Thermodynamics Of A Hydrophobic Polymeric Flocculant On Hydrophobic Colloidal Coal Particles*,Langmuir 1991, 7, pp. 2203-2207, Apr. 8, 1991.

* cited by examiner

Primary Examiner—Zakiya W. Bates
Assistant Examiner—Angela DiTrani
(74) Attorney, Agent, or Firm—Robert A. Kent; Crutsinger & Booth

(57) ABSTRACT

The invention provides a composition for use in a subterranean formation penetrated by a wellbore, the composition comprising: a) a solvent consisting essentially of a water-soluble solvent selected from the group consisting of any solvent that is at least 25% by weight soluble in water and any mixture of two or more thereof in any proportion, wherein the solvent is from about 90% to about 99.9% by weight of the composition; and b) a tackifying compound, wherein the tackifying compound is from about 0.01% to about 10% by weight of the composition; wherein the tackifying compound and the solvent are mutually selected such that, for the ratio of the tackifying compound to the solvent, the tackifying compound is soluble in the solvent. The invention also provides a method for treating a subterranean formation penetrated by a wellbore, the method comprising the steps of: a) forming the composition; and b) introducing the composition through the wellbore into the subterranean formation. Preferably, the solvent consists essentially of isopropyl alcohol.

10 Claims, No Drawings

METHODS AND COMPOSITIONS FOR ENHANCING HYDROCARBON PRODUCTION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

FIELD OF THE INVENTION

The invention generally relates to compositions and methods for treating a subterranean formation. More specifically, the invention relates to compositions and methods for treating a subterranean formation to control the migration of particulates, such as formation sand and fines, by using an ultra-thin tackifying compound.

BACKGROUND OF THE INVENTION

The invention relates to hydrocarbon production from wells drilled in a subterranean formation. Hydrocarbon is obtained from a subterranean formation by drilling a wellbore that penetrates the hydrocarbon-bearing formation. It is desirable to maximize both the rate of flow and the overall amount of flow of hydrocarbon from the subterranean formation to the surface.

The rate of hydrocarbon flow and the overall amount of hydrocarbon flow declines when the bottom hole flowing pressure falls below the dew point. When this occurs, a liquid aqueous phase accumulates near the well. This condensate accumulation, sometimes called condensate blocking, reduces the hydrocarbon relative permeability and thus the well's hydrocarbon productivity. The productivity loss associated with condensate buildup can be substantial. In some cases, well productivities can decline by a factor of 2 to 4 as a result of condensate accumulation.

The rate of hydrocarbon flow and the overall amount of hydrocarbon flow can be impacted when well treatment fluids such as fracturing fluids, gravel pack fluids, and aqueous acidizing fluids are injected into the formation. Well treatment fluids sometimes decrease hydrocarbon's relative permeability through the formation compared to other fluids in the reservoir because of the limited reservoir pressure and capillary forces tightly holding the treatment fluids in the pore spaces previously occupied by hydrocarbon. The pockets of treatment fluid, which are interlocked with hydrocarbon, are hard to remove from the formation without some kind of stimulation treatment.

Another way that the rate of hydrocarbon flow and the overall amount of hydrocarbon flow is reduced is by fines production or sand migration in the formation or by precipitation. The high velocity in the porous medium near the wellbore is sometimes sufficient to mobilize fines that can then plug channels in the formation. More often, formation sand and fines often become unstable and migrate as a result of water movement through the formation. Fines are most likely to move when the phase they wet is mobile, and since most formation fines are water-wet, the presence of a mobile water phase can cause fines migration and subsequent formation damage. It is desirable to minimize fines migration, since fines block flow paths, choking the potential production of the well, as well as causing damage to downhole and surface equipment, such as screens, pumps, flow lines, storage facilities, etc.

The problem of fines production is especially a problem in unconsolidated subterranean zones. Hydrocarbon wells are often located in subterranean zones that contain unconsolidated particulates that may migrate within the subterranean formation with the oil, gas, water, and/or other fluids produced by the wells. The presence of particulates, such as formation sand, in produced fluids is disadvantageous and undesirable in that the particulates may abrade pumping and other producing equipment and reduce the fluid production capabilities of the producing zones. Unconsolidated subterranean zones include those that contain loose particulates and those wherein the bonded particulates have insufficient bond strength to withstand the forces produced by the production of fluids through the zones.

One method of controlling particulates in unconsolidated formations involves placing a filtration bed containing sand or "gravel" near the well bore in order to present a physical barrier to the transport of unconsolidated formation fines with the production of hydrocarbons. Typically, such gravel packing operations involve the pumping and placement of a quantity of a desired particulate into the unconsolidated formation in an area adjacent to a well bore.

One common type of gravel packing operation involves placing a gravel pack screen in the well bore and packing the surrounding annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow.

When installing the gravel pack, the gravel is carried to the formation in the form of a slurry by mixing the gravel with a viscose transport fluid. Once the gravel is placed in the well bore, the viscosity of the transport fluid is reduced, and it is returned to the surface. Some gravel packing operations, commonly known as "high-rate water packing" operations, the transport fluid viscosity is somewhat lowered and yet the gravel remains in suspension because the treatment occurs at a substantially higher velocity.

Gravel packs, inter alia act to stabilize the formation while causing minimal impairment to well productivity. The gavel, inter alia, acts to prevent the particulates from occluding the screen or migrating with the produced fluids. The screen, inter alia, acts to prevent the gravel from entering the production tubing. However, such gavel packs may be time consuming and expensive to install.

Another method used to control particulates in unconsolidated formations involves consolidating a subterranean producing zone into hard, permeable masses. Consolidation of a subterranean formation zone often involves applying a resin followed by a spacer fluid and then a catalyst. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst, an exothermic reaction occurs that may result in rapid polymerization, potentially damaging the formation by plugging the pore channels, halting pumping when the well bore is plugged with solid material, or resulting in a downhole explosion as a result of the heat of polymerization. Also, using these conventional processes to treat long intervals of unconsolidated regions is not practical due to the difficulty in determining if the entire interval has been successfully treated with both the resin and the external catalyst.

In addition to the unconsolidated formation sands often found in subterranean formations, particulate materials are often introduced into subterranean zones in conjunction with conductivity enhancing operations and sand control operations. Conductivity enhancing and sand control operations may be performed as individual treatments, or may be combined where desired.

Therefore, it is desirable to develop a treatment method and composition to improve or maintain the rate of hydrocarbon flow and increase the overall amount of hydrocarbon flow as well as reduce fines migration, which often results in near-wellbore damage, so that the hydrocarbon flow rate and overall amount of hydrocarbon flow can be maintained at an acceptable level.

SUMMARY OF THE INVENTION

The invention provides a composition for use in a subterranean formation penetrated by a wellbore, the composition comprising: a) a solvent consisting essentially of a water-soluble solvent selected from the group consisting of any solvent that is at least 25% by weight soluble in water and any mixture of two or more thereof in any proportion, wherein the solvent is from about 90% to about 99.9% by weight of the composition; and b) a tackifying compound, wherein the tackifying compound is from about 0.01% to about 10% by weight of the composition; wherein the tackifying compound and the solvent are mutually selected such that, for the ratio of the tackifying compound to the solvent, the tackifying compound is soluble in the solvent.

The invention also provides a composition for a subterranean formation penetrated by a wellbore, the composition comprising: a) a solvent consisting essentially of isopropyl alcohol, wherein the solvent is from about 90% to about 99.9% by weight of the composition; and b) a tackifying compound, wherein the tackifying compound is from about 0.01% to about 10% by weight of the composition.

The invention also provides a method for treating a subterranean formation penetrated by a wellbore, the method comprising the steps of: a) forming a composition, wherein the composition comprises: i) a solvent consisting essentially of a water-soluble solvent selected from the group consisting of any solvent that is at least 25% by weight soluble in water and any mixture of two or more thereof in any proportion, wherein the solvent is from about 90% to about 99.9% by weight of the composition; and ii) a tackifying compound, wherein the tackifying compound is from about 0.01% to about 10% by weight of the composition; wherein the tackifying compound and the solvent are mutually selected such that, for the ratio of the tackifying compound to the solvent, the tackifying compound is soluble in the solvent; and b) introducing the composition through the wellbore into the subterranean formation.

The invention also provides method for treating a subterranean formation penetrated by a wellbore, the method comprising the steps of: a) forming a composition, wherein the composition comprises: i) a solvent consisting essentially of isopropyl alcohol, wherein the solvent is from about 90% to about 99.9% by weight of the composition; and ii) a tackifying compound, wherein the tackifying compound is from about 0.01% to about 10% by weight of the composition; and b) introducing the composition through the wellbore into the subterranean formation.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF THE PREFERRED EMBODIMENTS

In accordance with the invention, the composition of the invention comprises a solvent and a tackifying compound that can be introduced into a subterranean formation. The composition of the invention can be incorporated in a mixture with a particulate material such as conventional proppants or gravel packing materials and introduced into a subterranean formation, or the composition can be introduced as a treatment fluid to contact conventional proppants or gravel packing materials that had been previously introduced.

The solvent of the invention consists essentially of a water-soluble solvent selected from the group consisting of any solvent that is at least 25% by weight soluble in water and any mixture of two or more thereof in any proportion. The presently most-preferred water-soluble solvent for use in the invention is isopropyl alcohol. It is also contemplated that other water-soluble solvents, such as butylglycidyl ether, dipropylene glycol methyl ether, butyl bottom alcohol, dipropylene glycol dimethyl ether, dimethyl formamide, diethyleneglycol methyl ether, ethyleneglycol butyl ether, methanol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, or any mixtures in any proportion. Preferably, the water-soluble solvent is hygroscopic, or readily absorbs water. The solvent is from about 90% to about 99.9% by weight of the composition. Preferably, the solvent is present in the composition at a weight percent of about 95-99%.

The tackifying compound for use in the invention can be selected from the group consisting of a polyamide, a polyester, a polycarbonate, a polycarbomate, a natural resin, or any mixture thereof in any proportion. The tackifying compound can also comprise a condensation reaction product of dimmer acid containing some trimer and higher oligomers and some monomer acids with a polyamine. Further, the tackifying compound can comprise at least one member selected from the group consisting of ethelenediamine, diethienetriarnine, triethylenetetraamine, tetraethylene pentaaminc, aminoethylpiperazine, and any mixture thereof in any proportion. Other tackifying compounds for use in the invention are also within the scope of the invention, especially such tackifying compounds described in Halliburton's U.S. Pat. No. 5,775,425 issued Jul. 7, 1998; U.S. Pat. No. 5,787,986 issued Aug. 4, 1998 by Jim D. Weaver et al.; U.S.

Pat. No. 5,833,000 issued Nov. 10, 1998 by Jim D. Weaver et al.; U.S. Pat. No. 5,839,510 issued Nov. 24, 1998 by Jim D. Weaver et al.; U.S. Pat. No. 5,871,049 issued Feb. 16, 1999 by Jim D. Weaver et al.; U.S. Pat. No. 5,853,048 issued Dec. 29, 1998 by Jim D. Weaver; and U.S. Pat. No. 6,047,772 issued Apr. 11, 2000 by Jim D. Weaver et al., and U.S. Pat. No. 6,209,643 issued Apr. 3, 2001 by Philip D. Nguyen et al., the entire disclosures of which are incorporated herein by reference in their entirety. The tackifying compound is from about 0.01% to about 10% by weight of the composition. Preferably, the tackifying compound is from about 0.1% to about 5% by weight of the composition.

The ratio of the tackifying compound in the water-soluble solvent can be from about 0.01:99.99 to about 10:90 by weight relative to one another. The tackifying compound and the solvent are mutually selected such that, for the ratio of the tackifying compound to the solvent, the tackifying compound is soluble in the solvent. The ratio of the tackifying compound in the water-soluble solvent can also be from about 0.5:99.5 to about 5:95 by weight relative to one another. The tackifying compound and the solvent are mutually selected such that, for the ratio of the tackifying compound to the solvent, the tackifying compound is soluble in the solvent. For example, the ratio of polyamide in isopropyl alcohol is from about 1:99 to about 3:97 by weight relative to one another.

Without being limited to theory, it is believed that the composition of the invention advantageously increases hydrocarbon flow rate and overall amount of hydrocarbon flow as a combined result of: a) miscible displacement of water by the water-soluble solvent to reduce or prevent water buildup (water "block") which chokes off the flow path of hydrocarbon; b) stabilization of the formation fines by the tackifying compound; and c) "wetting" the surface of the formation with the tackifying compound that serves to repel water with its hydrophobicity. It is believed that displacing water from the formation and introducing a tackifying compound provide synergistic benefits to increase hydrocarbon production. As a result, permeability of aqueous fluids is increased through the composition-treated formation, which allows the water to be expelled out of the formation matrix near the wellbore or fracture faces surrounding the proppant pack.

It has been found that the water-soluble solvent for use in the invention increases the relative permeability of hydrocarbon compared to other aqueous fluids in the formation by reducing water condensate and water blocking in the subterranean formation. The hygroscopic, water-soluble solvent is effective in removing both condensate and water to restore gas productivity in both low and high permeability formations. The water-soluble solvent removes both water and condensate by a multi-contact miscible displacement. Further explanation of this theory is found in SPE 77546, entitled "Laboratory Measurements of Condensate Blocking and Treatment for Both Low and High Permeability Rocks", and SPE 80901, entitled "A Successful Methanol Treatment in a Gas-Condensate Reservoir: Field Application".

Also, the invention serves to stabilize the formation fines by consolidating the fines in the formation, thereby preventing the fines from migrating, which consequently results in blocking hydrocarbon flow paths. In particular, the fines are stabilized by the tackifying compound, thereby preventing fines from plugging the pores of the formation, especially after acidizing treatments. Further, the fines are prevented from being produced, disrupting the production schedule and damaging downhole and surface equipment.

Furthermore, the tackifying compound of the composition is capable of coating the surfaces of the formation sands or particulates, the surface of propped fractures or natural fractures, and/or the surface of proppants, thus "wetting" the surface with the tackifying compound. Wettability describes how a fluid adheres to a surface. Wettability plays a major role in defining how hydrocarbon and water coexist in pores of a formation and, therefore, influence numerous properties such as relative permeability of fluids. When more than one fluid is present in a permeable system, the flow of each is affected by the amount and distribution of the other(s). In uniformly wetted formations, the relative permeability to one fluid increases as the system becomes more wetted by the other fluid.

The tackifying compound forms an oil-wet surface on the formation, thereby increasing the permeability of aqueous fluids through the formation. With an increase of permeability of aqueous fluids through the formation, the production of the aqueous fluids is facilitated. It is desired to increase the permeability of aqueous fluids through the formation because the presence of aqueous fluid, whether from natural brines, a result of condensation, or injected as a treatment, acts as a barrier to hydrocarbon migration from the formation into the wellbore. The aqueous-based treatment fluids can saturate the pore spaces of the treated region, preventing the migration of hydrocarbon into and through the same pore spaces. In an analogous manner, if the well is to be produced without first stimulating, naturally occurring aqueous fluids in the formation in the flow path or potential flow path may hinder hydrocarbon production.

It is believed that the tackifying compound chemically binds to the surface of the formation, particulates, or proppants, at least partially coating the surface, thereby increasing its hydrophobicity. In this way, the coating of the tackifying compound formed on the surface is able to remain on the surface over an extended period of time, providing long-term benefits. Thus, minor, if any, amount of tackifying compound is produced from the formation.

The composition of the invention can be introduced ahead of, along with, or following any well treatment procedure, including but not limited to hydraulic fracturing treatments, gravel packing treatments, and acidizing treatments. The composition of the invention can also include other materials that do not adversely affect the benefits of the composition.

The composition of the invention can also be used in conjunction with a preflush treatment fluid. For example, a preflush treatment fluid comprising a mixture of mutual solvent and brine or simply a brine solution can be introduced into the formation to remove oil residue prior to introducing the composition. Other preflush treatment fluids are also contemplated, such as an acidizing treatment.

Further, the composition can be used as a preflush treatment for hydraulic fracturing or a prepack treatment fluid for gravel packing operations.

The composition can be used as a remedial treatment to be injected into the formation through the proppant or gravel pack of a previously performed fracturing treatment or gravel pack.

The composition can also be used to coat gravel or other particulates to alter the surface wettability of the gravel, proppant, or other particulates in order to easily remove any water or condensate that is formed in the porous matrix of the gravel, proppant, or other particulates, as well as in the formation matrix located near the gravel pack, proppant pack, or acidized fractures.

The composition is especially advantageous as a remediation treatment after the tackifying compound is used to at least partially coat proppants as described in Halliburton's U.S. Pat. No. 5,775,425 issued Jul. 7, 1998; U.S. Pat. No. 5,787,986 issued Aug. 4, 1998 by Jim D. Weaver et al.; U.S. Pat. No. 5,833,000 issued Nov. 10, 1998 by Jim D. Weaver et al.; U.S. Pat. No. 5,839,510 issued Nov. 24, 1998, by Jim D. Weaver et al.; U.S. Pat. No. 5,871,049 issued Feb. 16, 1999 by Jim D. Weaver et al.; U.S. Pat. No. 5,853,048 issued Dec. 29, 1988 by Jim D. Weaver; and U.S. Pat. No. 6,047,772 issued Apr. 11, 2000 by Jim D. Weaver et al., and U.S. Pat. No. 6,209,643 issued Apr. 3, 2001 by Philip D. Nguyen et al. When used as a remediation treatment in such applications, an especially advantageous oil-wet surface on the proppants as well as the formation's surface is formed by the composition. The composition allows aqueous fluids to easily flow through the formation to be produced from the formation or to flow into the formation such as in aqueous well treatment fluids.

The invention also provides a method for treating a subterranean formation penetrated by a wellbore, the method comprising the steps of: a) forming a composition, wherein the composition comprises: i) a solvent consisting essentially of a water-soluble solvent selected from the group consisting of any solvent that is at least 25% by weight soluble in water and any mixture of two or more thereof in any proportion, wherein the solvent is from about 90% to about 99.9% by weight of the composition; and ii) a tackifying compound, wherein the tackifying compound is from about 0.01% to about 10% by weight of the composition; wherein the tackifying compound and the solvent are mutually selected such that, for the ratio of the tackifying compound to the solvent, the tackifying compound is soluble in the solvent; and b) introducing the composition through the wellbore into the subterranean formation. The method can also comprise the step of flowing back fluid from the subterranean formation. The fluid that is flowed back from the subterranean formation can comprise water from the formation, brine from the formation, water or brine that has been introduced into the formation, and or any mixture thereof in any proportion.

The invention also provides method for treating a subterranean formation penetrated by a wellbore, the method comprising the steps of: a) forming a composition, wherein the composition comprises: i) a solvent consisting essentially of isopropyl alcohol, wherein the solvent is from about 90% to about 99.9% by weight of the composition; and ii) a tackifying compound, wherein the tackifying compound is from about 0.01% to about 10% by weight of the composition; and b) introducing the composition through the wellbore into the subterranean formation. The method can also further comprise the step of flowing back fluid from the subterranean formation. The fluid that is flowed back from the subterranean formation can comprise water from the formation, brine from the formation, water or brine that has been introduced into the formation, and or any mixture thereof in any proportion.

In one embodiment of the invention, the invention provides a method comprising the steps of: a) introducing a drying fluid through the wellbore to remove water condensate from the formation, wherein the fluid has the property of being hygroscopic; and thereafter b) introducing a composition through the wellbore into the subterranean formation, wherein the composition comprises a solvent and a tackifying compound. The tackifying compound is from about 0.01% to about 10% by weight of the composition, and the tackifying compound and the solvent are mutually selected such that, for the ratio of the tackifying compound to the solvent, the tackifying compound is soluble in the solvent.

In another embodiment, the invention provides a method for treating a subterranean formation penetrated by a wellbore, the method comprising the steps of: a) introducing a drying fluid through the wellbore into the subterranean formation, wherein the drying fluid comprises isopropyl alcohol; and thereafter b) introducing a composition through the wellbore into the subterranean formation, wherein the composition comprises a solvent; and a tackifying compound. The tackifying compound is from about 0.01% to about 10% by weight of the composition, and the tackifying compound and the solvent are mutually selected such that, for the ratio of the tackifying compound to the solvent, the tackifying compound is soluble in the solvent.

The drying fluid for this embodiment of the invention can be any hygroscopic fluid. The presently most-preferred drying fluid for use in the invention is isopropyl alcohol. It is believed that by introducing a drying fluid prior to introducing the composition of solvent and tackifying compound, much of the condensate can be removed from the formation. It is also contemplated that other water-soluble solvents, such as butylglycidyl ether, dipropylene glycol methyl ether, butyl bottom alcohol, dipropylene glycol dimethyl ether, dimethyl formamide, diethyleneglycol methyl ether, ethyleneglycol butyl ether, methanol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, or any mixtures in any proportion. Preferably, the drying fluid that is introduced into the subterranean formation consists essentially of isopropyl alcohol.

The solvent for this embodiment of the invention can be any solvent that is capable of dissolving the tackifying compound; however, the most preferred solvents are hygroscopic solvents, such as for example, butylglycidyl ether, dipropylene glycol methyl ether, butyl bottom alcohol, dipropylene glycol dimethyl ether, dimethyl formamide, diethyleneglycol methyl ether, ethyleneglycol butyl ether, methanol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, or any mixtures in any proportion. Of these, isopropyl alcohol is preferred. Other solvents that can be used to dissolve the tackifying compound can include distillates, butyl alcohol, a heavy aromatic solvent such as xylene, toluene, heavy aromatic naptha or the like, mutual solvents such as ethylene glycol monobutyl ether, propylene carbonate or n-methylpyrolidone or the like; however, it is believed that these solvents do not have the benefit of further removing condensate from the subterranean formation as do the hygroscopic solvents such as isopropyl alcohol. Preferably, the tackifying compound is introduced in an ultra-thin composition having about 90% or more by weight solvent. It should be understood by those skilled in the art that one or more intermediate steps can be performed between the steps of introducing the drying fluid and introducing the tackifying compound, provided that an intermediate step does not introduce a substantial amount of water into the formation. Of course, before or after treating the formation according to the invention with drying fluid and the tackifying compound, it would be possible to use other aqueous treatments.

To further illustrate the present invention, and not by way of limitation, the following examples are provided.

EXAMPLE 1

Experiments were performed with consolidated Berea core to determine if the composition of the invention will result in damage to the permeability of the core. The composition of the invention, or "ultra-thin tackifying compound," was prepared with 2% of low molecular weight polyamide tackifying compound and 98% isopropyl alcohol by weight relative to one another. To begin, Berea core with dimensions of 2.5 inches in length and 1 inch in diameter was first installed in Hassler sleeve and a confining pressure of 150 psi was applied on the core during the treatment. The treatment procedure includes the following steps: 1) saturate the core with kerosene or 3% KCl brine and measure initial permeability; 2) flush with ultra-thin tackifying compound; and 3) immediately reverse flow direction and measure permeability to stimulate production flow. Turning now to Table 1, listed are the results of permeability measurements using Berea cores for different fluid systems.

TABLE 1

Permeability Measurements Using Berea Cores for Different Fluid Systems

| Fluid systems | Initial permeability (mD) | Final permeability (mD) | % Retained permeability |
|---|---|---|---|
| Kerosene/ultra-thin tackifying compound/ Kerosene | 118 | 114 | 97 |
| 3% KCl/ultra-thin tackifying compound/ 3% KCl | 54 | 66 | 100+ |

The results of percent retained permeability indicate the treatment of the ultra-thin tackifying compound does not cause significant reduction in initial permeability values of the simulated formation cores, either the formation fluid is an aqueous or a hydrocarbon fluid.

EXAMPLE 2

To simulate formation fines, fines of Brazos River sand with sieve size of 200-mesh and smaller was used. Seven grams of the simulated formation fines were mixed with 10 grams of 20/40-mesh Ottowa sand. The mixture was packed inside a 1 inch ID transparent acrylic flow cell for ease of observation. Ottawa sand with mesh size of 40/60 mesh was packed below and 12/20-mesh Brady sand was packed above the simulated formation fines. The sand column was then saturated with 3% KCl brine and then flushed with 1 pore volume of ultra-thin tackifier (2% of low molecular weight polyamide tackifying compound and 98% isopropyl alcohol by weight relative to one another). Without curing or shut in, flow using 3% KCl brine was established through the treated sand column in the opposite direction from the flow during treatment. Flow rate was started at 10 mL/min and increased to 100 mL/min. Effluents were collected for total suspended solid analysis to determine if the simulated formation fines were effectively controlled by the treatment.

For comparison purposes, a control sample was prepared using the same sand column except that the ultra-thin tackifying treatment fluid was not applied. It was observed that as soon as flow was established, fines particulate immediately began to migrate into the sand pack, even at low flow rates, and produced out in the effluents. The effluents were also collected for total solid analysis (Table 2).

TABLE 2

Total Suspended Solid (mg/L) Collected in Each Effluent

| Simulated production flow rate (mL/min) | Treated with ultra-thin tackifying compound (mg/L) | Control without ultra-thin tackifying compound (mg/L) |
|---|---|---|
| 10 | 0 | — |
| 20 | 0 | 69 |
| 40 | 0 | 139 |
| 80 | 15 | 1320 |
| 100 | 19 | 868 |

The results in Table 2 indicate that that the composition treated with ultra-thin tackifier was able to effectively control fines production, and all treated columns showed significant improvement in fines control in comparison with the untreated control.

The fines-migration tests also show that the treatment with ultra-thin tackifier successfully stops fines from being produced out in acid-treated columns that have been previously treated with acid solution (here, 13.5% hydrochloric acid "HCl"/1.5% hydrofluoric acid "HF", which are made by mixing with a 3% KCl brine solution). In addition, as illustrated in Table 3, the ultra-thin tackifier treatment was shown to successfully stop fines migration in the fines-migration tests.

TABLE 3

Effect of Ultra-Thin Tackifying Compound in Controlling Brazos River Fines after Acid Treatment

| Flow Rate (mL/min) | Total Suspended Solid in Effluents from Brazos River Fines Columns (mg/L) | |
|---|---|---|
| | Control after HCl/HF treatment | Treated with ultra-thin tackifying compound after HCl/HF treatment |
| 10 | 90.8 | 29.3 |
| 20 | 48.5 | 10.9 |
| 40 | 202.1 | 10.1 |
| 80 | 459.4 | 22.8 |
| 100 | 162.5 | 20.2 |

The effectiveness of controlling carbonates fines and coal fines was also demonstrated by the column testing. The results are indicated in Table 4 and Table 5, respectively.

TABLE 4

Effect of Ultra-Thin Tackifying Compound in Controlling Carbonate Fines

| Flow Rate (mL/min) | Total Suspended Solid in Effluents from Carbonate Fines Columns (mg/L) | |
|---|---|---|
| | Control | Treated with ultra-thin tackifying compound |
| 10 | 0 | 0 |
| 20 | 115.3 | 0 |
| 40 | 21.2 | 5.1 |
| 80 | 197.9 | 9.3 |
| 100 | 153.3 | 10.1 |

TABLE 5

Effect of Ultra-Thin Tackifying Compound
in Controlling Coal Fines

| | Total Suspended Solid in Effluents from Coal Fines Columns (mg/L) | |
|---|---|---|
| Flow Rate (mL/min) | Control (without treatment) | Treated with ultra-thin tackifying compound |
| 10 | 90.2 | 45.6 |
| 20 | 141.7 | 8.8 |
| 40 | 386.9 | 14.9 |
| 80 | 694.9 | 20.9 |
| 100 | 578.6 | 25.0 |

The results indicated that the treatment of ultra-thin tackifying compound was able to effectively control fines production and all treated columns showed significant improvement in fines control comparing to that of the untreated column.

After careful consideration of the specific and exemplary embodiments of the present invention described herein, a person of ordinary skill in the art will appreciate that certain modifications, substitutions and other changes may be made without substantially deviating from the principles of the present invention. The detailed description is illustrative, the spirit and scope of the invention being limited only by the appended Claims.

What is claimed is:

1. A method for treating a subterranean formation penetrated by a wellbore, the method comprising the steps of:
    a. injecting a preflush treatment fluid into the subterranean formation through the wellbore, wherein the preflush treatment fluid comprises brine and a mutual solvent;
    b. forming a composition, wherein the composition comprises:
        i. a solvent consisting essentially of a water-soluble solvent selected from the group consisting of any solvent that is at least 25% by weight soluble in water and any mixture of two or more thereof in any proportion, wherein the solvent is from about 90% to about 99.9% by weight of the composition; and
        ii. a tackifying compound, wherein the tackifying compound is from about 0.01% to about 10% by weight of the composition;
        wherein the tackifying compound and the solvent are mutually selected such that, for the ratio of the tackifying compound to the solvent, the tackifying compound is soluble in the solvent; and
    c. introducing the composition through the wellbore into the subterranean formation.

2. A method for treating a subterranean formation penetrated by a wellbore, the method comprising the steps of:
    a. injecting a preflush treatment fluid into the subterranean formation through the wellbore, wherein the preflush treatment fluid comprises brine and a mutual solvent;
    b. forming a composition, wherein the composition comprises:
        i. a solvent consisting essentially of isopropyl alcohol, wherein the solvent is from about 90% to about 99.9% by weight of the composition; and
        ii. a tackifying compound, wherein the tackifying compound is from about 0.01% to about 10% by weight of the composition; and
    c. introducing the composition through the wellbore into the subterranean formation.

3. The method according to claim 1, wherein the water-soluble solvent is selected from the group consisting of butyiglycidyl ether, dipropylene glycol methyl ether, butyl bottom alcohol, dipropylene glycol dimethyl ether, dimethyl formamide, diethyleneglycol methyl ether, ethyleneglycol butyl ether, methanol.diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, and any mixture thereof in any proportion.

4. The method according to claim 1, wherein the water-soluble solvent is hygroscopic.

5. The method according to claim 1 or 2, wherein the tackifying compound is selected from the group consisting of a polyamide, a polyester, a polycarbonate, natural resin, or any mixture thereof in any proportion.

6. The method according to claim 1 or 2, further comprising the step of flowing back fluid from the subterranean formation.

7. The method according to claim 1 or 2, further comprising the step of introducing the composition with a particulate.

8. The method according to claim 1 or 2, further comprising the step of producing hydrocarbon.

9. A method for treating a subterranean formation penetrated by a wellbore, the method comprising the steps of:
    a. introducing a drying fluid through the wellbore to remove water condensate from the formation, wherein the fluid has the property of being hygroscopic; and thereafter
    b. introducing a composition through the wellbore into the subterranean formation, wherein the composition comprises:
        i a solvent; and
        ii. a tackifying compound, wherein the tackifying compound is from about 0.01% to about 10% by weight of the composition;
    wherein the tackifying compound and the solvent are mutually selected such that, for the ratio of the tackifying compound to the solvent, the tackifying compound is soluble in the solvent.

10. A method for treating a subterranean formation penetrated by a wellbore, the method comprising the steps of:
    a. introducing a drying fluid through the wellbore into the subterranean formation, wherein the drying fluid comprises isopropyl alcohol; and thereafter
    b. introducing a composition through the wellbore into the subterranean formation, wherein the composition comprises:
        i. a solvent; and
        ii. a tackifying compound, wherein the tackifying compound is from about 0.01% to about 10% by weight of the composition;
    wherein the tackifying compound and the solvent are mutually selected such that, for the ratio of the tackifying compound to the solvent, the tackifying compound is soluble in the solvent.

* * * * *